US010959297B2

(12) United States Patent
Tanaka et al.

(10) Patent No.: US 10,959,297 B2
(45) Date of Patent: Mar. 23, 2021

(54) HEATING COIL, HEAT TREATMENT APPARATUS, AND HEAT TREATMENT METHOD FOR ELONGATED WORKPIECE

(71) Applicant: Neturen Co., LTD., Tokyo (JP)

(72) Inventors: Yoshimasa Tanaka, Tokyo (JP); Yutaka Sugiyama, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 1907 days.

(21) Appl. No.: 14/380,043

(22) PCT Filed: Feb. 27, 2013

(86) PCT No.: PCT/JP2013/056047
§ 371 (c)(1),
(2) Date: Aug. 20, 2014

(87) PCT Pub. No.: WO2013/129686
PCT Pub. Date: Sep. 6, 2013

(65) Prior Publication Data
US 2015/0028023 A1    Jan. 29, 2015

(30) Foreign Application Priority Data
Mar. 2, 2012  (JP) .............................. JP2012-047435

(51) Int. Cl.
*H05B 6/40* (2006.01)
*C21D 1/42* (2006.01)
(Continued)

(52) U.S. Cl.
CPC ................ *H05B 6/40* (2013.01); *C21D 1/10* (2013.01); *C21D 1/42* (2013.01); *C21D 1/667* (2013.01);
(Continued)

(58) Field of Classification Search
CPC . H05B 6/40; H05B 6/10; H05B 6/101; H05B 6/104; C21D 1/10; C21D 1/42
(Continued)

(56) References Cited

U.S. PATENT DOCUMENTS 3,483,346 A * 12/1969 Frisch ...................... C21D 1/10
                                                          219/639
2009/0183804 A1   7/2009 Zhao et al.
2011/0011499 A1 * 1/2011 Lengauer ................. C21D 1/10
                                                          148/526

FOREIGN PATENT DOCUMENTS

CN           102560016 B       7/2012
EP              2037720 A2     3/2009
(Continued)

OTHER PUBLICATIONS

Office Action dated Jun. 23, 2016 in corresponding Chinese Application No. 201380012198.9, with English translation.
(Continued)

*Primary Examiner* — Tu B Hoang
*Assistant Examiner* — Alba T Rosario-Aponte
(74) *Attorney, Agent, or Firm* — Wenderoth, Lind & Ponack, L.L.P.

(57) ABSTRACT

A heating coil of a heat treatment apparatus is configured to inductively heat an elongated workpiece having a recessed lateral surface. The heating coil includes a base conductor and a projected conductor. A width of the projected conductor is narrower than a width of the base conductor. The projected conductor is arranged to project toward the recess from a position of the base conductor. The base conductor and the projected conductor are arranged to extend in a longitudinal direction of the workpiece. A heat treatment apparatus includes a cooling section and the heating coil. A heat treatment method uses the heating coil described above.

5 Claims, 7 Drawing Sheets

(51) Int. Cl.
- *C21D 1/667* (2006.01)
- *C21D 1/10* (2006.01)
- *H05B 6/10* (2006.01)
- *H05B 6/42* (2006.01)
- *C21D 9/00* (2006.01)

(52) U.S. Cl.
CPC ........... *C21D 9/0062* (2013.01); *H05B 6/101* (2013.01); *H05B 6/104* (2013.01); *H05B 6/42* (2013.01); *Y02P 10/25* (2015.11)

(58) Field of Classification Search
USPC ................ 219/635, 637, 639, 643, 646, 672
See application file for complete search history.

(56) References Cited

FOREIGN PATENT DOCUMENTS

| JP | 60200917 A | * | 10/1985 | ............... C21D 9/04 |
|----|------------|---|---------|--------------------------|
| JP | 5-222444   |   | 8/1993  |                          |
| JP | 6-220527   |   | 8/1994  |                          |
| JP | 10-204537  |   | 8/1998  |                          |
| JP | 11-269537  |   | 10/1999 |                          |
| JP | 2000-204413 A |   | 7/2000 |                          |
| JP | 2000204413 A | * | 7/2000 |                          |
| JP | 2001279320 A | * | 10/2001 |                         |
| JP | 2004-204247 |   | 7/2004 |                          |
| JP | 2004-204248 A |   | 7/2004 |                        |
| JP | 2006-019230 A |   | 1/2006 |                        |
| JP | 3924084 B2 |   | 3/2007 |                          |

OTHER PUBLICATIONS

English Abstract of JP 3924084 (B2).
English Abstract of JP 2004-204248 (A).
English Abstract of JP 2000-204413 (A).
English Abstract of CN 102560016 (B).
English Abstract of JP 2006-019230 (A).
International Search Report.
English Translation of Office Action dated Jan. 26, 2016 in corresponding Chinese Patent Application No. 201380012198.9.

* cited by examiner

HEATING COIL, HEAT TREATMENT APPARATUS, AND HEAT TREATMENT METHOD FOR ELONGATED WORKPIECE

TECHNICAL FIELD

The invention relates to a heating coil for heating a recessed lateral surface of an elongated workpiece along a longitudinal direction of the workpiece, and also to a heat treatment apparatus and a heat treatment method for heat-treating the recessed lateral surface of the elongated workpiece.

BACKGROUND ART

Related art heating coils are configured such that, when heat-treating an elongated workpiece having a recessed lateral surface, the recessed lateral surface is heated without heating other lateral surfaces of the workpiece.

For example, JP3924084B2 discloses a heating coil having rod-shaped conductors extending in a widthwise direction of an elongated workpiece orthogonal to the longitudinal direction of the workpiece, and protrusions formed on the conductors so as to be inserted into respective recesses on the lateral surfaces, thereby inductively heating the entire recessed lateral surfaces of the workpiece while relatively moving the workpiece in the longitudinal direction. The heating coil is configured to prevent insufficient heating at longitudinal ends of the workpiece.

JP2004-204248A discloses a heating coil apparatus having coil bodies disposed on respective sides of an elongated workpiece with respect to a lateral direction orthogonal to a feeding direction of the workpiece, and protrusions formed on the coil bodies so as to protrude toward respective recesses on lateral surfaces of the workpiece. Each protrusion is designed to have a size that can inductively heat the recess of the corresponding lateral surface uniformly in the longitudinal direction, thereby improving heating efficiency.

However, the portion of the heating coil that heats the entire lateral surface of the elongated workpiece is disposed so as to extend in a direction orthogonal to the longitudinal direction of the lateral surface. Therefore, the area of the portion of the coil that faces the workpiece is limited, which makes it difficult to heat the workpiece at high speed.

To speed up the heat treatment, for example, the heating coil may be formed using a wider member to increase the area of the portion of the coil that extends across and faces the lateral surface of the elongated workpiece. In this case, however, the increased cross sectional area of the coil requires greater electric power, which deteriorates efficiency.

Alternatively, the number of portions of the coil that extend across the lateral surface of the workpiece may be increased, without using a wider member. However, this results in a complex configuration of the heating coil. As a consequence, an electric current path and a cooling fluid path through the coil also become complicated, which increases an output loss of the coil and makes it difficult to maintain a certain level of flow rate of cooling fluid.

SUMMARY OF INVENTION

It is an object of the present invention to provide a heating coil, a heat treatment apparatus, and a heat treatment method that are capable of speeding up a heat treatment on a lateral surface of an elongated workpiece with low power consumption.

According to an aspect of the present invention, a heating coil is provided. The heating coil is configured to inductively heat an elongated workpiece having a first lateral surface and a second lateral surface adjoining each other along a corner portion. The first lateral surface has a recess at a location spaced away from the corner portion. The first lateral surface, the second lateral surface and the recess extend continuously in a longitudinal direction of the workpiece. The heating coil includes a base conductor configured to face the first lateral surface, and a projected conductor configured to face the recess. A width of the projected conductor is narrower than a width of the base conductor. The projected conductor is arranged to project toward the recess from a position of the base conductor. The base conductor and the projected conductor are arranged to extend in the longitudinal direction.

According to another aspect of the present invention, a heat treatment apparatus is provided. The heat treatment apparatus includes the heating coil and a cooling section configured to cool the workpiece. The heating coil is arranged to inductively heat the workpiece that is being relatively moved in the longitudinal direction. The cooling section is arranged downstream of the heating coil in the longitudinal direction. At least a portion of the projected conductor is arranged upstream of the base conductor in the longitudinal direction.

According to another aspect of the present invention, a heat treatment method is provided. The heat treatment method includes inductively heating the workpiece by moving the workpiece in the longitudinal direction relative to the heating coil, and cooling the workpiece at a location downstream of the heating coil in the longitudinal direction. The projected conductor inductively heats the workpiece at a location upstream of the base conductor in the longitudinal direction.

DESCRIPTION OF EMBODIMENTS

Hereinafter, embodiments of the present invention will be described in detail with reference to the drawings.

Workpiece

Figure 1:
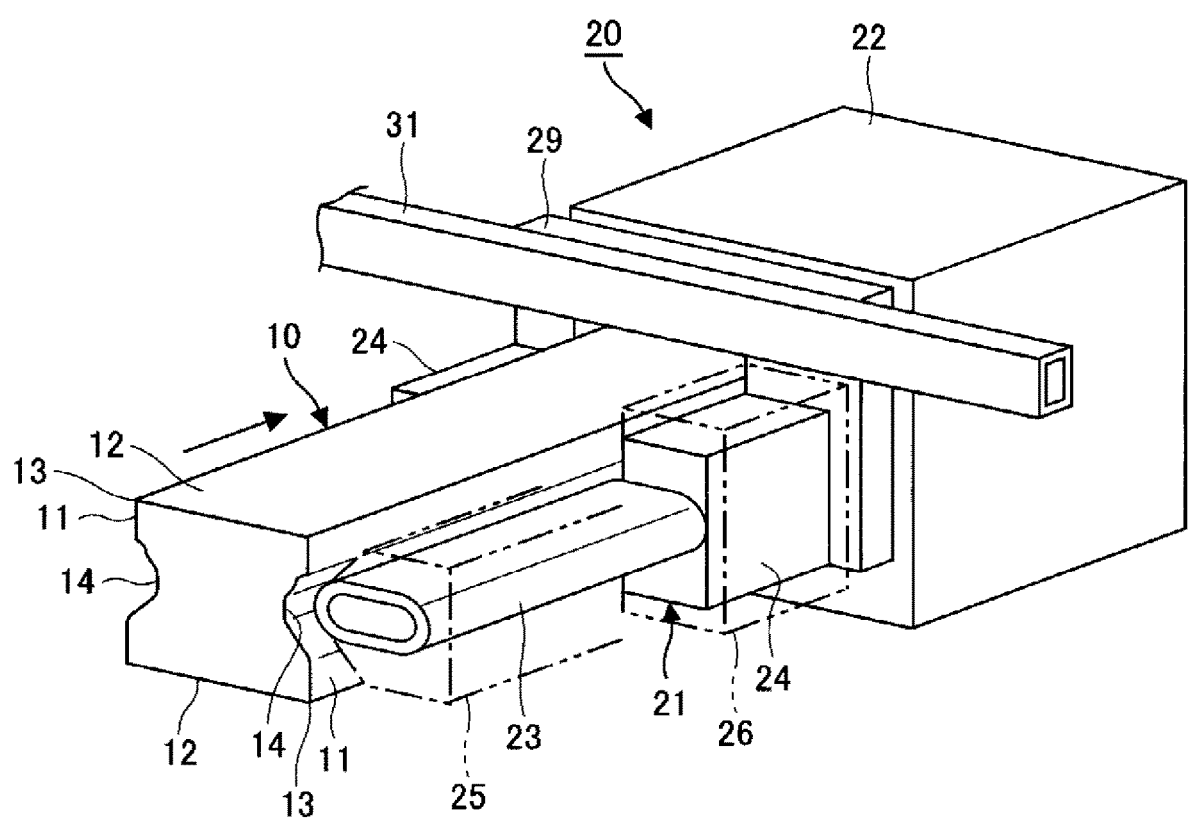
FIG. 1 is a perspective view of a heat treatment apparatus according to an embodiment of the present invention.
Figure 2:
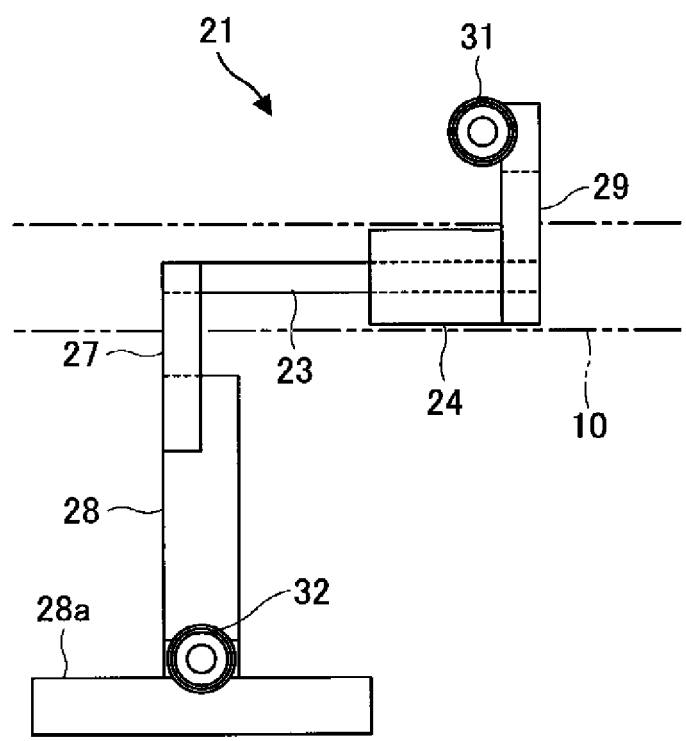
FIG. 2 is a front view of a heating coil of the a heat treatment apparatus.
Figure 3:
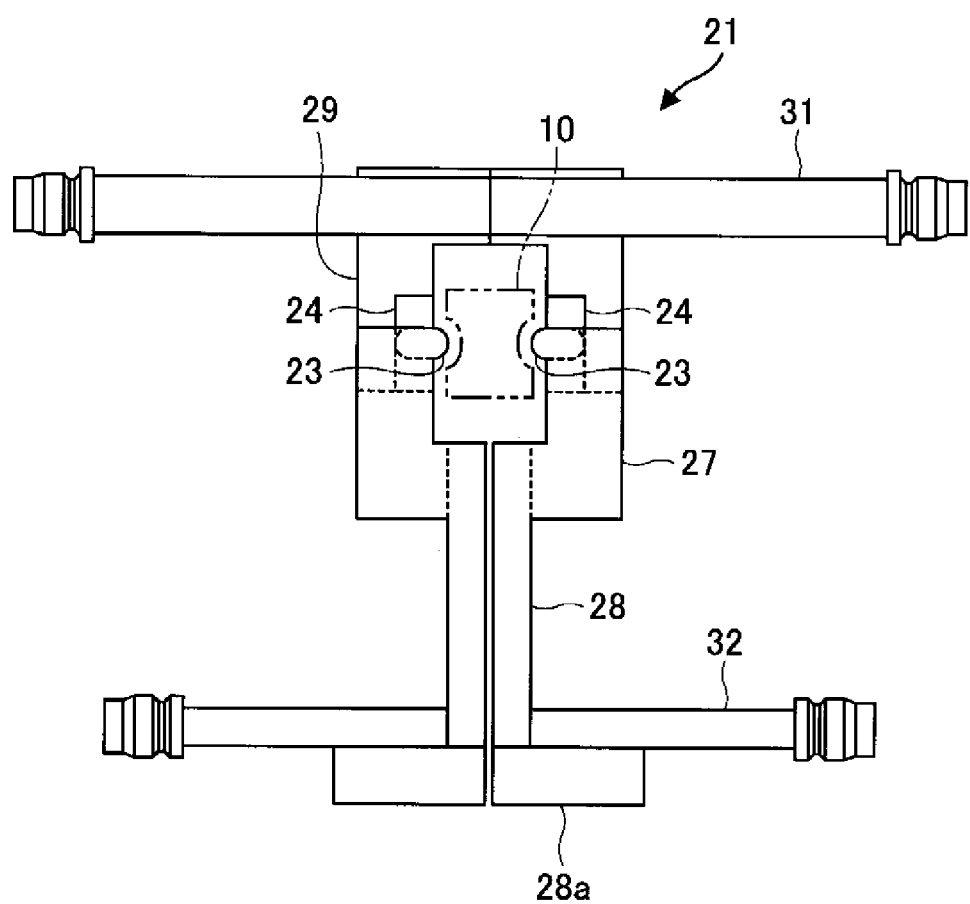
FIG. 3 is a left side view of the heating coil.
Figure 4:
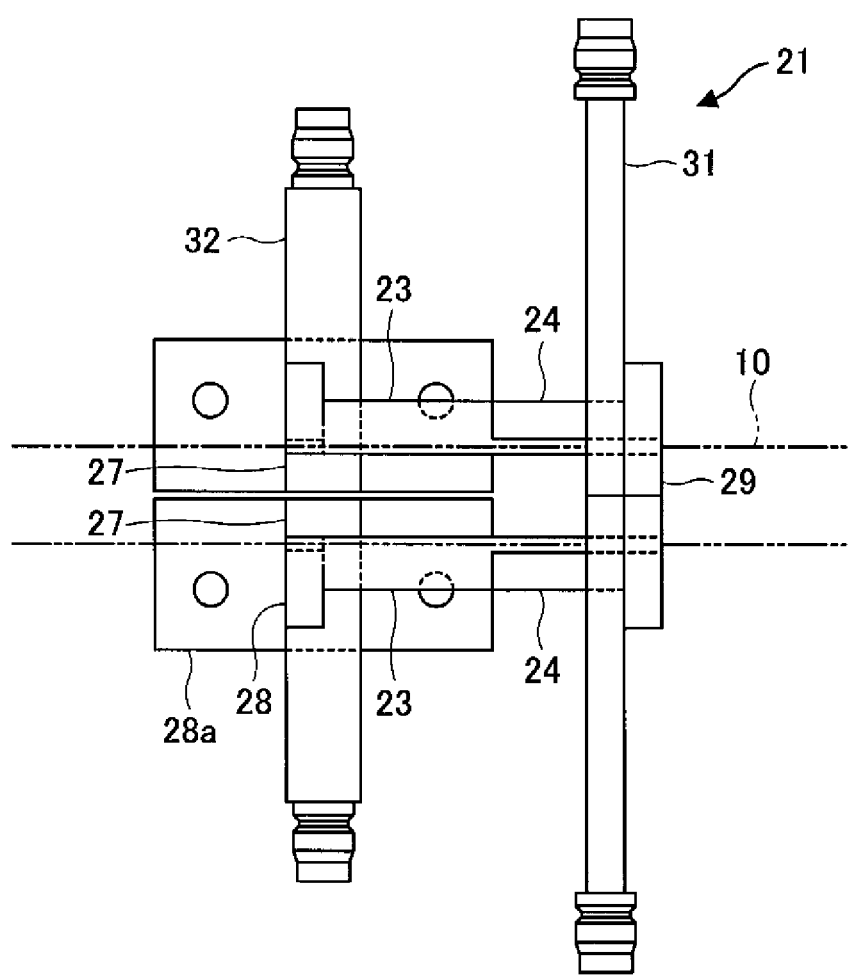
FIG. 4 is a plan view of the heating coil.

As shown in FIG. 1, a workpiece 10 to be heat treated in an embodiment of the present invention is an elongated workpiece having a substantially constant cross section taken along a plane orthogonal to a longitudinal direction of the workpiece 10. An axial line of the workpiece 10 described below is straight, but may have an arc shape or an annular shape.

The workpiece 10 has a substantially rectangular cross section. In FIG. 1, first lateral surfaces of the workpiece 10 on the right and left sides of the workpiece 10 have an irregular shape, and second lateral surfaces of the workpiece 10 on the top and bottom sides of the workpiece 10 are flat. The first lateral surface 11 and the second lateral surface 12 adjoin each other along a corner portion 13.

At the corner portion 13 the first lateral surface 11 and the second lateral surface 12 are connected to each other such that the first lateral surface 11 and the second lateral surface 12 form an angle. Non-limiting examples of the corner portion 13 include an angular apex, a rounded surface, an inclined surface, and a constricted surface. Heat transfer rate is higher at the corner portions 13 than at the first lateral surfaces 11 and the second lateral surfaces 12.

Each of the first lateral surfaces 11 is formed with a recess 14 at a location spaced away from the corner portions 13, at a central location in the present embodiment. The recess 14 is formed to extend continuously along the longitudinal direction of the workpiece 10. The profile of the recess 14 is not limited, in so far as the recess 14 is recessed with respect to its adjoining sides. In the present embodiment, the recess 14 is formed in each of the first lateral surfaces 11 provided on respective sides of the second lateral surfaces 12.

The first lateral surfaces 11, including the recesses 14, and the second lateral surfaces 12 of the workpiece 10 extend continuously in the longitudinal direction of the workpiece 10 over the entire length of the workpiece 10 in a substantially constant form.

Heat Treatment Apparatus

A heat treatment apparatus 20 is configured to perform heat treatment, such as quenching, on the workpiece 10. More specifically, the heat treatment apparatus 20 is configured to perform quenching on a surface layer of each of the first lateral surfaces 11. As shown in FIG. 1, the heat treatment apparatus 20 includes a heating coil 21 configured to inductively heat the first lateral surfaces 11 and a cooling section 22 disposed downstream of the heating coil 21 to cool the workpiece 10 by spraying a cooling fluid onto the workpiece 10. The heat treatment apparatus 20 is has a feed mechanism configured to move the workpiece 10 at a given speed toward one side along the longitudinal direction.

Heating Coil

As shown in FIGS. 1 to 4, the heating coil 21 has a plurality of projected conductors 23 and base conductors 24 that are arranged to face the first lateral surfaces 11, including the respective recesses 14, at the respective sides of the second lateral surfaces 12 of the workpiece 10. The projected conductors 23 and the base conductors 24 are joined together to form a single piece structure. Each of the base conductors 24 has a width that corresponds to the width of the first lateral surface 11 in a first direction orthogonal to the longitudinal direction of the workpiece 10, and is arranged to face the corresponding first lateral surface 11 with a gap therebetween. Each of the projected conductors 23 has a width that is narrower than the width of each of the base conductors 24 in the first direction, and is arranged to face the corresponding recess 14 with a gap therebetween.

Each of the base conductors 24 has a prismatic shape or a block shape, and a side of the base conductor 24 that faces the first lateral surface 11 has a substantially flat surface. The surface of each of the base conductors 24 that faces the first lateral surface 11 has a width that can heat the entire first lateral surface 11. Each of the projected conductors 23 has an oval shape, and a side of the projected conductor 23 that faces the recess 14 projects from the base conductor 24 and has a curved surface corresponding to a shape of the recess 14. That is, the projected conductor 23 is arranged to project toward the recess 14 from a position of the base conductor 24 in a second direction orthogonal to both the longitudinal direction and the first direction. The projected part of the projected conductor 23 has a size that can enter in the recess 14 of the workpiece 10.

The base conductor 24 and the projected conductor 23 are arranged to extend along a longitudinal axis of the workpiece 10. It is preferable that the projected conductor 23 be longer than the base conductor 24 in the longitudinal direction. Further, it is preferable that the base conductor 24 be arranged to overlap the projected conductor 23, at least partially, preferably entirely.

One end of the base conductor 24 and one end of the corresponding projected conductor 23 are arranged at the same position in the longitudinal direction. A portion of the projected conductors 23 is arranged to protrude toward one side from the corresponding base conductor 24 in the longitudinal direction, that is, toward an upstream of the base conductor 24.

A magnetic flux concentrating member 25 may be provided at a portion of the projected conductor 23 that does not face the workpiece 10, and a magnetic flux concentrating member 26 may provided at a portion of the base conductor 24 that does not face the workpiece 10, so that the magnetic flux is more concentrated on the first lateral surfaces 11 and the recesses 14.

Figure 5:
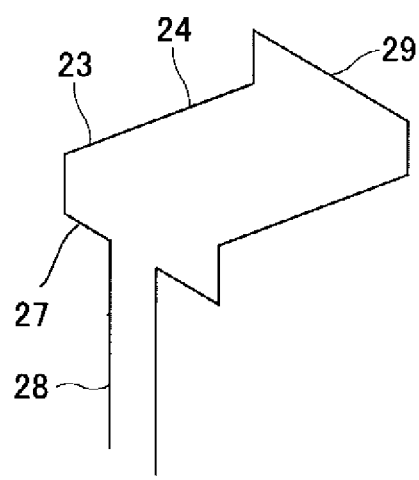
FIG. 5 is a diagram illustrating an electric current path of the heating coil.

An end conductor 27 is joined to one end of each of the projected conductors 23. A lead 28 connected to a power source is provided on each of the end conductors 27. The ends of the base conductors 24 are joined to a C-shaped coupling conductor 29, whereby the base conductors 24 are coupled to each other. As shown in FIG. 5, electric current is supplied from one of the leads 28 and flows through the heating coil 21 in the order of the end conductor 27, the projected conductor 23 and the base conductor 24 on one side, and via the coupling conductor 29, the base conductor 24, the projected conductor 23, the end conductor 27 and the lead 28 on the other side.

Cooling fluid inlet portion 31 is provided on the coupling conductor 29, and a cooling fluid outlet portion 32 is provided on a contact portion 28a of each of the leads 28. Each of the conductors 23, 24, 27, 29 is formed from a hollow member, such as a steel pipe. These conductors 23, 24, 27, 29, the cooling fluid inlet portion 31, and the cooling fluid outlet portion 32 are brought into mutual communication with each other, whereby a cooling fluid flow path is formed. According to the present embodiment, an intermediate portion of the coupling conductor 29 is blocked so that separate lines of cooling fluid flow path is provided on respective sides of the first lateral surfaces 11.

Heat Treatment Method

To perform heat treatment on the workpiece 10 using the heat treatment apparatus 20 having the heating coil 21, as shown in FIG. 1, the workpiece 10 is relatively moved at given speed towards one side along the longitudinal direction such that the workpiece 10 passes through the heating coil 21 to which high frequency power is fed and the cooling section 22 to which cooling fluid is fed.

Figure 6A:
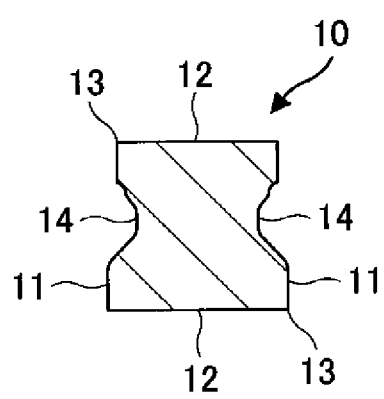
FIGS. 6A to 6D are diagrams illustrating a heat treatment method according to an embodiment of the present invention.
Figure 6C:
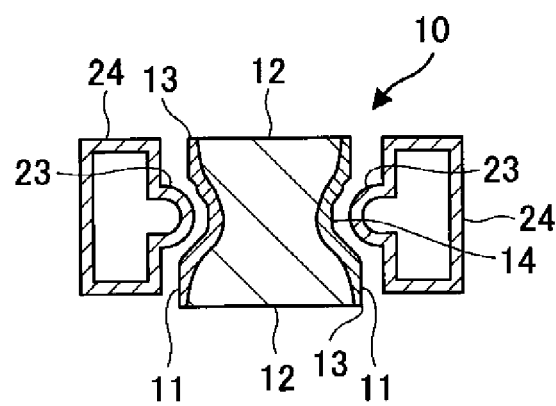
Figure 6B:
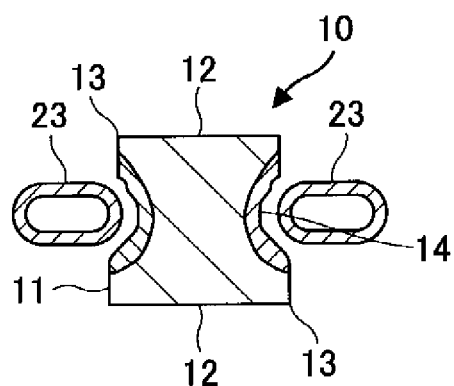

The workpiece 10 illustrated in FIG. 6A firstly passes by the projected conductors 23, the recesses 14 and the portions near the recesses 14 of the first lateral surfaces 11 are inductively heated as shown in FIG. 6B. Subsequently, the workpiece 10 passes by the base conductors 24, whereby the entire first lateral surfaces 11 are inductively heated as shown in FIG. 6C.

Figure 6D:
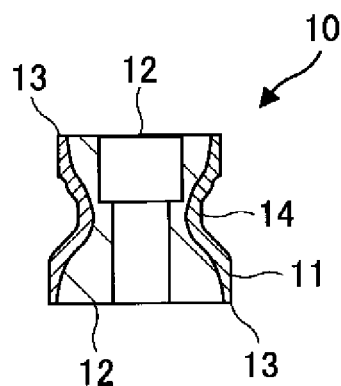

In this state, at a location immediately after passing by the coupling conductor 29 of the heating coil 21, the cooling section 22 sprays a cooling fluid onto the workpiece 10 to rapidly cool the workpiece 10, whereby the surface layer of each of the first lateral surfaces 11 is quenched along the shape of the first lateral surface 11, and the heat treatment ends. After the heat treatment, the workpiece 10 may be cut from the second lateral surface 12, which are not quenched, such as tapping of screw holes, as shown in FIG. 6D.

According to the heating coil 21 described above, the base conductor 24 that faces the first lateral surface 11 and the projected conductor 23 that faces the recess 14 are arranged to extend along the longitudinal direction of the workpiece 10 such that electric current flows through the base conductor and the projected conductor in the longitudinal direction. Therefore, a length along which the heating coil 21 faces the workpiece 10 can be extended, so that the first lateral surfaces 11 can be heated without increasing electric power.

Further, because the base conductors 24 and the projected conductors 23 are arranged to extend along the longitudinal direction of the workpiece 10, the shape of the heating coil 21 can be made to conform to the shape of the workpiece 10 with a simple configuration. Therefore, an electric current flowing distance can be made short to suppress loss, and the coil cooling fluid flow path can be made simple and easy to cool.

As a result, heat treatment of the first lateral surfaces 11 of the workpiece 10 can be speeded up with small electric power.

When the base conductor 24 is arranged to overlap the projected conductor 23, it is advantageous in that the length along which the heating coil 21 faces the workpiece 10 can be shortened, so that the heating coil 21 can be made compact.

By making the projected conductor 23 longer than the base conductor 24 in the longitudinal direction, when heating the first lateral surface 11, the recess 14 and the portion of the first lateral surface 11 near the recess 14 are sufficiently heated by the projected conductor 23, and the base conductor 24 can heat the overall first lateral surface 11 with a small amount of heat. Accordingly, the first lateral surface 11 can be efficiently heated while preventing excessive heating of the second lateral surface 12 which otherwise may be caused by heat transfer.

That is, fast heat transfer occurs at the corner portions 13, so that the second lateral surfaces 12 are likely to be widely heated by heat from the first lateral surfaces 11. In view of this, the base conductors 24 heat the overall first lateral surfaces 11 with a small amount of heat, thereby minimizing heating of the second lateral surfaces 12.

The heating coil 21 heats the workpiece 10 that is relatively moved from the projected conductors 23 toward the base conductors 24. That is, the projected conductors 23 firstly heat the recesses 14 and the portions near the recesses 14, and the base conductors 24 subsequently heat the overall first lateral surfaces 11. Therefore, it is possible to minimize a risk of the second lateral surfaces 12 being excessively heated by heat transfer at the time when the heating is finished.

When the projected conductors 23 and the base conductors 24 are formed as a single piece structure, attachment and positioning of the heating coil can be easily performed. Besides, the electric current flow distance and the cooling fluid flow path can be made short and simple, whereby the heat treatment of the workpiece 10 can be further speeded up.

When the heating coil 21 has a plurality of sets of the projected conductor 23 and the base conductor 24 and the sets are coupled to each other at the projected conductor 23 or the base conductor 24 of each of the sets, heat treatment of the plurality of first lateral surfaces 11 and the recesses 14 of the first lateral surfaces 11 of the workpiece 10 can be speeded up with smaller power. In particular, by suppressing excessive heating of the second lateral surfaces 12 at the time when the heating is finished, change in composition of the second lateral surfaces 12 between the first lateral surfaces 11 is prevented, whereby processability of the second lateral surfaces 12 is ensured.

According to the heat treatment apparatus 20 and the heat treatment method using the heating coil 21, it is possible to speed up heat treatment of the first lateral surfaces 11 of the workpiece 10 with small electric power. The projected conductors 23 heat the recesses 14 at a location upstream of the base conductors 24, and the workpiece 10 is quenched immediately after heating the overall lateral surfaces 11. Therefore, the first lateral surfaces 11 can be heat treated while suppressing the second lateral surfaces 12 from being heat treated.

While the present invention has been described with reference to a certain embodiment thereof, various changes and modifications can be made therein within the scope of the present invention.

For example, in the above embodiment, at least a portion of the base conductor 24 is arranged to overlap the projected conductor 23. However, the base conductor 24 and the projected conductor 23 may be arranged at different locations in the longitudinal direction of the workpiece 10. In this case also, it is preferable that the projected conductor 23 be arranged upstream of the base conductor 24, so that the overall first lateral surface 11 is heated by the base conductor 24 after the recess 14 has been heated by the projected conductor 23, and a temperature of the recesses 14 is prevented from excessively dropping before reaching the cooling section 22.

EXAMPLES

First Example

Induction heating and cooling were performed in the same manner as in a first reference example except that the heating coil 21 shown in FIG. 1 was used and electric power was supplied at a frequency of 10 kHz. As a result, the first lateral surfaces 11 and the recesses 14 were quenched in a suitable manner. An increase in the temperature of the cooling fluid for the heating coil 21 from an inlet side to an outlet side was 8° C.

Second Example

Induction heating and cooling were performed in the same manner as in a second reference example except that the heating coil 21 shown in FIG. 1 was used and a feed rate of the workpiece 10 was increased by 30%. As a result, the first lateral surfaces 11 and the recesses 14 were quenched in a suitable manner. An increase in the temperature of the cooling fluid for the heating coil 21 from an inlet side to an outlet side was 12.5° C.

First Reference Example

Figure 7:
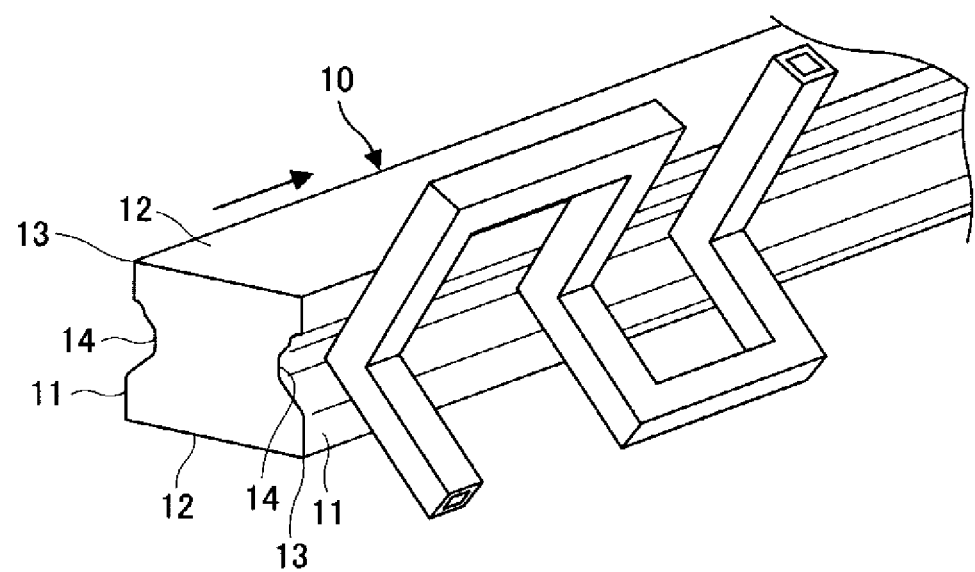
FIG. 7 is a perspective view of a heating coil according to a reference example.

A workpiece 10 having a substantially rectangular cross section with recesses 14 provided on the pair of first lateral surfaces 11 was prepared, an angled heating coil was prepared and disposed in a heating region as shown in FIG. 7, and induction heating and cooling were carried out by feeding electric power to the heating coil at a frequency of 25 kHz. As a result, the first lateral surfaces 11 and the recesses 14 were quenched in a suitable manner. An increase in the temperature of the cooling fluid for the heating coil from an inlet side to an outlet side was 21° C.

Second Reference Example

Induction heating and cooling were performed in the same manner as in the first reference example except that electric power was higher by 20% and was fed at a frequency of 10 kHz. The first lateral surfaces 11 and the recesses 14 were not quenched in a suitable manner, and sufficient hardness was not provided.

Results of the examples show that the heating coils 21 of the first and second examples could suitably perform quenching at smaller electric power while speeding up heat treatment. As for the heating coil shown in FIG. 7, the heat treatment speed was improved as compared with the related art by ensuring a sufficient area where the heating coil faces the workpiece 10 while suppressing electrical interactions. However, when compared with the heating coils 21 of the first and second examples, the heat treatment speed with the heating coil shown in FIG. 7 was lower. Further, the heating coil shown in FIG. 7 entailed a great increase in temperature of cooling fluid and a greater loss than that caused by the heating coils 21 of the examples. Thus, it was found that the heat treatment efficiency with the heating coil shown in FIG. 7 is lower that with heating coils 21 of the examples.

INDUSTRIAL APPLICABILITY

One or more embodiments of the invention provide a heating coil, a heat treatment apparatus, and a heat treatment method that are capable of speeding up a heat treatment on a lateral surface of an elongated workpiece with low power consumption.

This application is based on Japanese Patent Application No. 2012-047435 filed on Mar. 2, 2012, the entire content of which is incorporated herein by reference.

The invention claimed is:

1. A heating coil configured to inductively heat an elongated workpiece, the workpiece having a first lateral surface and a second lateral surface adjoining each other along a corner portion, wherein the first lateral surface has a recess at a location spaced away from the corner portion, and the first lateral surface, the second lateral surface and the recess extend continuously in a longitudinal direction of the workpiece, the heating coil comprising:

a base conductor configured to face the first lateral surface; and a projected conductor configured to face the recess, wherein a width of the projected conductor is narrower than a width of the base conductor in a first direction orthogonal to the longitudinal direction, wherein the projected conductor is arranged to project toward the recess from a position of the base conductor in a second direction orthogonal to both the longitudinal direction and the first direction, wherein the base conductor and the projected conductor are arranged to extend in the longitudinal direction such that electric current flows through the base conductor and the projected conductor in the longitudinal direction, and wherein the projected conductor is longer than the base conductor in the longitudinal direction.

2. The heating coil according to claim 1, wherein the base conductor is arranged to overlap the projected conductor.

3. The heating coil according to claim 1, wherein at least a portion of the projected conductor is arranged to project from the base conductor in the longitudinal direction.

4. The heating coil according to claim 1, wherein the base conductor and the projected conductor are formed as a single piece structure.

5. The heating coil according to claim 1, wherein a plurality of sets of the base conductor and the projected conductor are provided so as to correspond to the first lateral surface provided on each side of the second lateral surface, and the plurality of sets are coupled to each other at the projected conductor or the base conductor of each of the sets.

* * * * *